United States Patent [19]

Gorges et al.

[11] Patent Number: 4,463,774
[45] Date of Patent: Aug. 7, 1984

[54] FUSELAGE-MOUNTED VALVE FOR CONDENSATE DRAINAGE AND CABIN-AIR PRESSURIZATION

[75] Inventors: Friedrich J. Gorges, Bellevue, Wash.; Robert V. Hodges, Norfolk, Va.

[73] Assignee: The Boeing Company, Seattle, Wash.

[21] Appl. No.: 462,033

[22] Filed: Jan. 28, 1983

[51] Int. Cl.$^3$ .................... F16K 17/36; F16K 43/00; B64C 1/00
[52] U.S. Cl. .................... 137/81.1; 98/1.5; 137/238; 137/315; 137/454.5; 244/129.1; 251/63.6
[58] Field of Search .............. 137/81.1, 238, 315, 137/454.5, 454.6, 454.2, 494, 498, 500, 517; 244/1 R, 129.1, 129.4, 129.5; 98/1.5; 251/63, 63.6

[56] References Cited

U.S. PATENT DOCUMENTS

| | | | |
|---|---|---|---|
| 944,048 | 12/1909 | Price | 137/454.5 |
| 2,338,505 | 1/1944 | Gregg | 137/81.1 |
| 2,345,547 | 3/1944 | Roth et al. | 137/81.1 |
| 2,437,187 | 3/1948 | Esbaugh | 137/81.1 |
| 2,565,720 | 8/1951 | Collison et al. | 4/111.1 |
| 2,571,667 | 10/1951 | Bondurant | 137/81.1 |
| 2,655,932 | 10/1953 | Lipman | 137/899.2 |
| 2,672,085 | 3/1954 | Fischer | 137/81.1 |
| 2,686,024 | 8/1954 | Zimmer | 244/135 R |
| 2,880,749 | 4/1959 | Brown | 137/899.2 |
| 3,022,797 | 2/1962 | Allin | 137/599.2 |
| 3,026,897 | 3/1962 | Derrington et al. | 137/315 |
| 3,060,831 | 10/1962 | Fitz-Gerald | 98/1.5 |
| 3,079,941 | 3/1963 | Cruise et al. | 137/266 |
| 3,387,621 | 6/1968 | Schaff | 137/454.5 |
| 3,476,141 | 11/1969 | Tillman | 137/498 |
| 3,498,056 | 3/1970 | Avery | 60/39.09 |
| 3,618,626 | 11/1971 | Russo | 137/498 |

Primary Examiner—George L. Walton
Attorney, Agent, or Firm—Christensen, O'Connor, Johnson & Kindness

[57] ABSTRACT

A "bilge-like" valve, adapted to be mounted on the lowermost wall of an aircraft fuselage, is disclosed in which the valve has a normally open condition to drain accumulated condensate through a registering opening in the fuselage wall when the interior cabin is depressurized, and assumes a closed condition in response to a differentially higher cabin pressure relative to outside air pressure to seal off the interior of the fuselage. A valve housing retainer is affixed to the inner surface of the fuselage wall in registration with the wall opening for detachably retaining a valve housing incorporating a piston-like reciprocating valve member and biasing spring that is insertable and removable through the wall opening from the exterior of the aircrafts fuselage for ease of servicing. The housing retainer is of a generally inverted cup shape and has a central, interiorally threaded opening arranged in overlying registration with the fuselage wall opening for receiving the valve housing which is cylindrically shaped and has cooperating exterior threads. The valve housing is installed and removed by a tool that is inserted in a specially shaped valve port and which is used to apply a rotating force to the valve housing from the exterior of the aircraft. The perimeter of the cup shaped retainer protectively surrounds the installed valve housing, and is formed with a plurality of fluid passing, debris blocking ports to ensure reliable valve operation and complete drainage of condensate when the valve is open.

10 Claims, 7 Drawing Figures

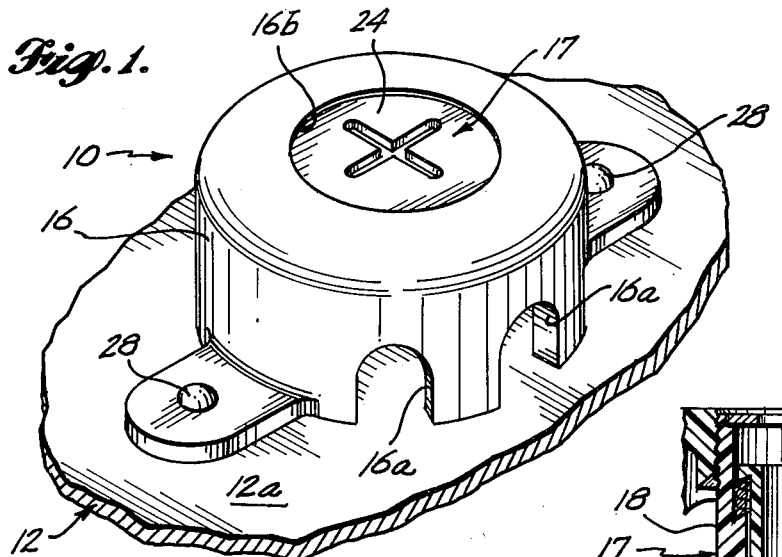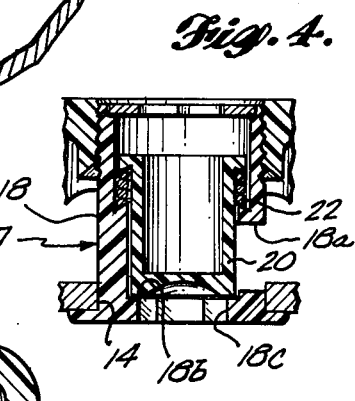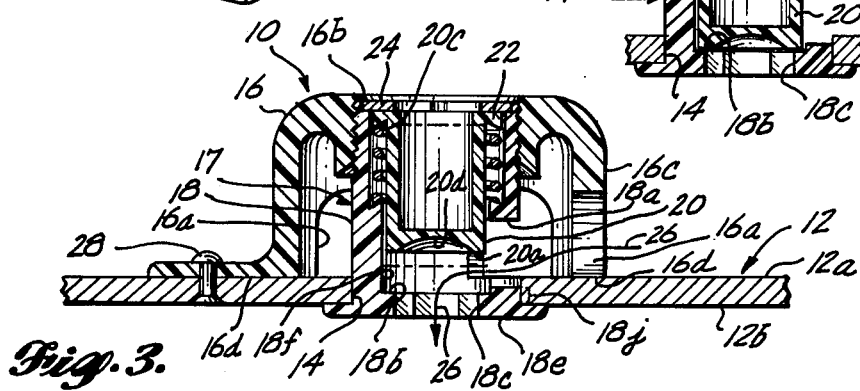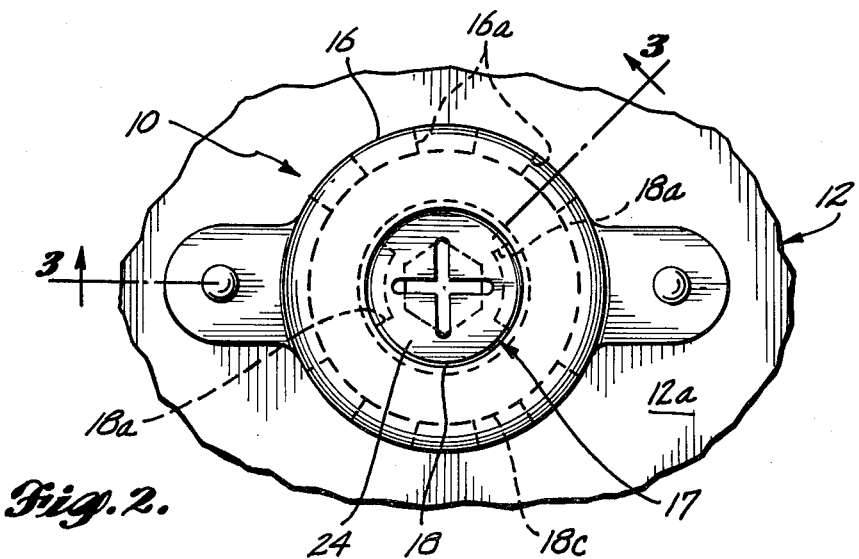

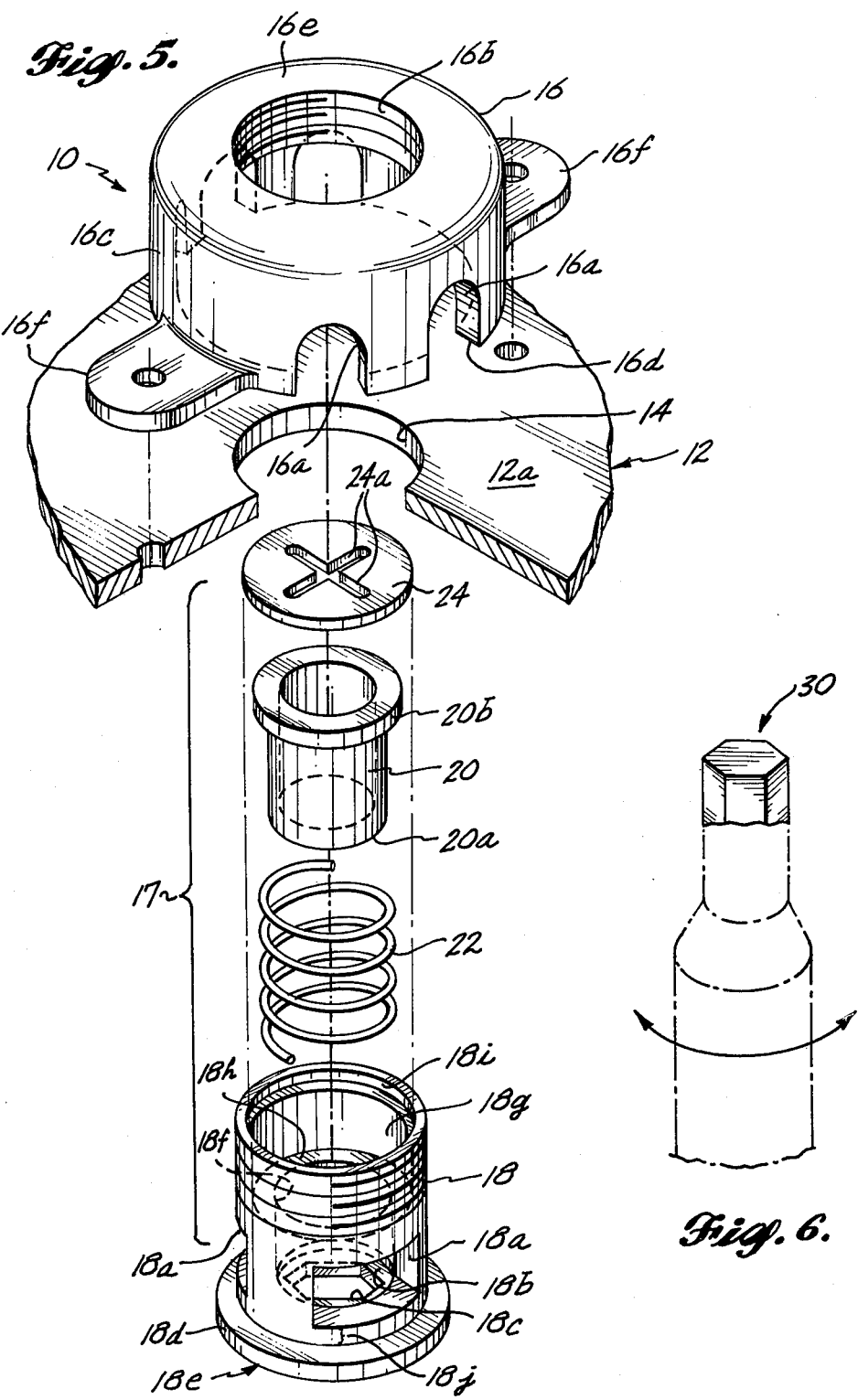

FUSELAGE-MOUNTED VALVE FOR CONDENSATE DRAINAGE AND CABIN-AIR PRESSURIZATION

BACKGROUND OF THE INVENTION

The invention pertains to condensate draining, air pressure sealing valves that are mounted on an aircraft fuselage at various positions along the belly to drain off condensate collected in the bilge-like area of the fuselage, and to close in response to cabin air pressurization to form an airtight seal.

Because of the water draining purpose of these valves and their placement on the belly of the aircraft fuselage, they are sometimes referred to in the industry as "bilge valves." A number of bilge valve configurations have been heretofore proposed, and for large, commercial carrier aircraft, a widely-used, self-acting valve mechanism comprises an inverted U-shaped metal bracket supporting a spring baised flapper valve preassembled as a unit and permanently installed on the inside surface of the fuselage wall with the flapper in registration with a drain opening in the fuselage wall. The flapper is normally biased away from the opening for condensate drainage, and closes in response to increasing differential air pressure due to cabin pressurization.

While such flapper-type bilge valves work fairly well when the aircraft is new, and under ideal conditions of a clean, debris-free bilge area, aging of the aircraft, and, a normal accumulation of dirt, grit, metal chips, and dropped fastener parts, such as nuts, bolts, rivots, etc., results in such debris being carried by draining water and escaping air to the valve mechanism and where it often interferes with the proper opening and closing of the flapper valve. The valve may be stuck in the closed position or partially closed position preventing proper drainage of condensate which will lead to rust and deterioration of the fuselage wall. A valve stuck in the open or partially opened position allows air to escape through the valve during cabin pressurization and results in consequence loss of air conditioning efficiency. Currently, the relatively small loss of air through a malfunctioning bilge valve is tolerated and compensated by simply increasing the source of fresh, cabin pressurizing air from the bleed-air system of the engines. However, recent efforts to design more efficient aircraft systems have placed limitations on the amount of available bleed-air and this in turn has demanded greater efforts to seal off the fuselage interior during cabin pressurization to minimize air loss. Furthermore, safety requirements sometimes demand an airtight seal during cabin pressurization so that in the event of a fire, fire extinguishing chemicals, which are automatically discharged into the cargo compartments, are not dissipated by escaping through incompletely closed bilge valves. Another disadvantage of leaking bilge valves is that the escaping air, being at a lower velocity than outside airstream, causes turbulence which in turn produces undesirable drag. Conventional flapper valves of the above-described type, have not always provided the needed airtight seal, mostly because of interference from the inevitable debris that accumulates in the aircraft bilge area. Also, the flapper type valves are notoriously difficult to install and are often located in misalignment with the drain opening thereby decreasing the effectiveness of the air seal when the valve is closed.

Furthermore, in order to correct a bilge valve that has malfunctioned for one or more of the above reasons, it is necessary to replace the valve by gaining access to the interior belly of the fuselage, which in most modern, commercial carriers requires the removal of the cargo floorboards over the location of each of the bilge valves. A typically large jet powered commercial carrier may have as many as thirty to forty of these bilge valves placed at various locations along the length of the fuselage, requiring a major servicing effort to first gain access to the belly area where the valve is mounted and then removing the valve and installing a new one. Because of the difficulty in servicing these valves, often aircraft owners will simply accept the costly loss of cabin air and the consequent inefficiency of the bleed-air system and increased fuel consumption.

While other valve configurations have been proposed, such proposals either do not solve one or more of the above noted primary problems, or the designs are impractical because of being too costly to manufacture and/or to maintain, too fragile for long trouble-free operation (for example some existing bilge valves are susceptible to being crushed by workmen walking on the fuselage wall during assembly and maintenance of the aircraft), too heavy, too susceptible to corrosion, and create undesirable resistance to airflow due to excessive projection from the exterior surface of the fuselage wall.

SUMMARY OF THE INVENTION

In accordance with the present invention, the above-noted problems associated with existing bilge valves are overcome by the combination of a valve housing retainer that is affixed to the inner surface of the fuselage wall and in registration with the wall opening for detachably receiving a valve housing that is insertable and removable through the wall opening in the fuselage from the aircrafts exterior. Arranged within the valve housing are a valve member that has a reciprocative movement between a valve open position for draining collected condensate through the wall opening, and a closed position for creating an airtight seal for cabin pressurization. Means are also provide within the valve housing for biasing the valve member in its open position, and for yielding to differential air pressure between the interior and exterior of the fuselage to cause the valve member to move to its closed position. The valve housing including a preassembled valve member and biasing means may be removed as a unit from the exterior of the aircraft through the opening in the fuselage wall by disengaging the housing from the housing retainer. In the preferred form of the invention as described herein, the valve housing is of generally cylindrical shape and is threaded into engagement with a cooperatively threaded opening formed in the housing retainer lying in registration with the fuselage wall opening.

Also in the preferred form of the invention, the housing retainer is of a generally inverted cup shape in which the rim of the cup fits against the inside surface of the fuselage wall and protectively surrounds the opening in the fuselage wall and the valve housing which is threaded into a central opening formed in a wall of the cup shaped retainer that overlies the fuselage wall opening. Fluid and air passing, debris blocking ports are formed in the cup shaped retainer adjacent the cup rim for complete drainage down to the level of the inner surface of the fuselage wall that surrounds the wall opening. These retainer ports are sized to block any debris that will interfere with the free reciprocative movement of the valve member.

Further, in accordance with the preferred embodiment, the cylindrically shaped valve housing is hollow and open at both ends, and has a flange portion adjacent one end which seats against the exterior periphery of the fuselage wall opening when the opposite end of the housing has been inserted and threaded into engagement with the retainer. A centrally located opening in the flanged end of the valve housing provides a valve port through which water and air can pass between the interior and exterior of the fuselage when the valve is opened, and this port cooperates with the valve member to close the valve during cabin pressurization. Preferably, the valve port is formed with a tool receiving and torque accommodating shape, such a hexagonal shape, for receiving a matching tool to assist in rotatably threading and unthreading the valve housing with respect to the retainer.

Additional features and advantages of the preferred embodiment of the invention include a relatively simple, durable construction that can be mass manufactured at a relatively small per unit cost; a geometry that lends itself to a rugged structure so that it is not susceptible to being crushed by workmen walking on the inside surface of the fuselage near the installation locations of the valve; a configuration that is readily aligned with the drain opening in the fuselage wall; a self-cleaning valve seat adjacent the above-mentioned valve port and an aerodynamically shaped, coooperating valve member which cause a scowing airflow effect across a surface of the valve housing on which the valve member seats in the valve closed position.

To provide a complete disclosure of the invention, reference is made to the appended drawings and following description of one particular and preferred embodiment.

BRIEF DESCRIPTION OF THE DRAWINGS

FIG. 1 is an isometric view of the valve assembly in accordance with the invention installed in registration with an opening (not shown in FIG. 1) in the wall of the fuselage for draining condensate when the valve is open and for assuming a closed condition for sealing off the wall opening when the cabin is pressurized.

FIG. 2 is a top elevational view of the valve assembly of FIG. 1.

FIG. 3 is a vertical, sectional view through valve assembly and fuselage wall taken along section line 3—3 of FIG. 2, and showing the valve in its open condition.

FIG. 4 is a fragment of a sectional view similar to FIG. 3 but showing the valve in its closed condition.

FIG. 5 is an exploded view of the valve assembly and fuselage wall.

FIG. 6 is a fragmentary, isometric view of a tool used for installing and removing a valve housing that forms part of the valve assembly of FIGS. 1–5.

DETAILED DESCRIPTION OF PREFERRED EMBODIMENT

Figure 7:
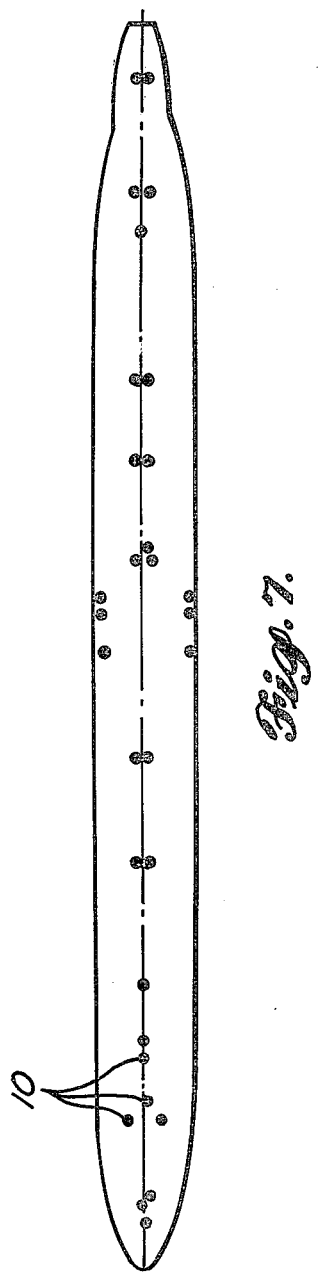
FIG. 7 is a schematic of a typical, commercial carrier fuselage showing common locations of the plurality of bilge valves mounted at various locations within the fuselage bilge-like areas.

With reference to FIG. 1, valve assembly 10 is shown mounted on the inner surface 12a of fuselage wall 12 in registration with a circular opening (see opening 14 in FIGS. 3 and 5) for allowing fluid such as accumulated condensate, to drain through wall opening 14 when valve assembly 10 is open, and for sealing off wall opening 14 when the interior of the fuselage is pressurized relative to a lower atmospheric pressure outside the aircraft. As described herein, a biasing spring holds valve assembly 10 in the valve open position for draining condensate when the aircraft cabin is depressurized, i.e., when the interior of the cabin is allowed to assume atmospheric pressure such as at low elevations and when on the ground. At relatively higher elevations, the interior cabin is pressurized by an air conditioning unit powered by the engine bleed-air system. Increasingly higher pressure on the inside of fuselage wall 12 causes valve assembly 10 to overcome the spring bias and move to a valve closed condition which seals off opening 14 and allows the air conditioning system to maintain an optimum, and higher than outside air pressure within the cabin for maximum air conditioning efficiency and least fuel consumption. The reduced, or minimized fuel consumption is attributed to the fact that the engine bleed-air system that supplies fresh air to the cabin need not work as hard and hence, takes less power from the engines.

With reference to FIG. 3, valve assembly 10 includes a valve housing retainer 16 that is fastened to the inside surface 12a of fuselage wall 12, and a valve subassembly 17 including a housing 18, the main body portion of which is insertable through opening 14 for threaded and hence removable engagement with retainer 16. Subassembly 17 further incorporates a piston-like reciprocating valve member 20, a helical compression spring 22 and an apertured, retaining cap 24. As described in detail below, when the valve is in its open condition, as shown in FIG. 3, collected condensate and air are free to flow as indicated by arrow 26 through one or more of a plurality of cutouts 16a provided in a valve-surrounding-wall of retainer 16, through sidewall openings 18a formed in valve housing 18, and then through the open valve between the upwardly biased valve member 20 and a cooperating valve seat 18b provided on an interior surface of an end wall of housing 18 and surrounding a valve port 18c. The valve assumes the closed condition shown in FIG. 4 in response to cabin air pressurization which drives valve member 20 against the bias of spring 22 to contact seat 18b blocking port 18c.

More particularly, reference is now made to FIG. 5 in which retainer 16 has an inverted cup shape including a generally cylindrical wall portion 16c arranged coaxially with opening of 14 and having a lowermost circular rim or wall edge 16d that fits flush against the inner surface of 12a of fuselage wall 12 as shown in FIG. 3 so as to define, with valve housing 18, an annual cavity coaxially surrounding valve housing 18. Cylindrical wall 16c of retainer 16 is formed with a plurality of arch-shaped cutouts 16a that extend axially (upwardly as shown in the drawings) from the lowermost wall edge 16d so that when retainer 16 is mounted as shown in FIG. 3, cutouts 16a are located to drain the condensate down to the level of surface of 12a of fuselage wall 12. Rather than forming one or two relatively larger cutouts on retainer 16 for drainage, a larger number of cutouts 16a are provided and each is sized so as to pass fluid but block larger pieces of debris commonly found in the bilge area such as metal chips and dropped fasteners including, screws, bolts, rivots, etc. To accommodate sufficient flow rate for the collected water and to provide spare capacity should any of the passages become blocked, the cross-sectional area of three of the plurality of six cutouts 16a is adequate for quickly draining the usual amounts of collected condensate. In this embodiment, cut-outs 16a are a quarter-inch wide (measured along the circumference of wall 16c) for blocking the most common, one-quarter inch fasteners, and are between one-quarter and one-half inch high (measured along the axial direction of wall 16c).

At its top, retainer wall portion 16c blends into an annual end wall portion 16e, at the center of which is the coaxially, interiorally threaded opening 16b for receiving valve housing 18. When retainer 16 is installed as shown in FIGS. 1 and 3, opening 16b overlies and coaxially registers with fuselage wall opening 14. A pair of integrally formed mounting ears 16f project from diametrically opposed sides of retainer wall portion 16c adjacent wall edge 16d for mounting flush against surface 12a. Suitable fasteners are provided such as rivots 28 as shown in FIGS. 1 and 3 for fastening retainer 16 to wall 12 through matching holes provided in ears 28 and wall 12.

Valve subassembly 17, as shown in FIG. 5, has a housing 18 of generally hollow, cylindrical shape having a main body portion with an outside diameter just slightly less than that of the interior diameter of circular opening 14 in wall 12. The noninsertable end of housing 18 is formed with an end wall 18e (shown in FIG. 3) which projects radially outwardly beyond the outside diameter of the main cylindrical body portion of housing 18 to form a circular flange 18d and also extends inwardly to define the boundaries of valve port 18c through which water and air pass through fuselage wall opening 14 when the valve is open. When valve subassembly 17 is installed, flange 18d has an upwardly facing (as viewed in the drawings) annual shoulder which fits against the peripheral portion of the outside surface 12b of wall 12 that surround fuselage opening 14. The hollow interior of housing 18 has a piston receiving, cylindrical wall portion 18f disposed in the lower, approximately one-half axial length of housing 18 and adjacent end wall 18e for slidably receiving valve member 20. A second and larger diameter, interior cylinder wall 18g is provided in the remaining axial dimension of housing 18 between the uppermost extent of cylinder wall 18f and the upper end of housing 18 to form an annular, spring retaining chamber for spring 22. The radial offset between walls 18f and 18g define a spring retaining shoulder 18h which may be provided with an outwardly and downwardly sloping bevel, as shown in the drawings, to create a secure stop for the lower end of spring 22. A circular recess 18i is formed at the upper end of housing 18 and is mated to the perimeter of disc-shaped cap 24 which is fixed in recess 18e to hold spring 22 and valve member 20 in place when these components are assembled.

Two side wall openings 18a are formed in housing 18 adjacent end wall 18e and entering the interior of housing 18 through opposed sides of piston receiving cylinder wall 18f. It is important that the lowermost extent of openings 18a, namely the perimeter of openings 18a closest to wall 18e and valve seat 18b, be at a level equal to or lower than the interior surface 12a of fuselage wall 12 when the valve subassembly 17 is installed and fully screwed into a retainer 16 as depicted in FIG. 3. Otherwise, the complete draining of condensate would be partially blocked by a lip on housing 18 rising above surface 12a and surrounding opening 14 over which the water must flow to enter into housing 18 and be discharged through port 18c. This constraint is met by selecting the height dimension 18j, as shown in FIG. 5, between housing flange 18d and the lowermost extent of aperture 18a such that this height dimension 18j is less than the thickness of fuselage wall 12 as shown in FIG. 3.)

Valve member 20, as shown in FIG. 5, has the shape of a hollow cylinder in which one end is closed by wall 20a for blocking port 18c when member 20 is in the position shown in FIG. 4, and in which the other end of member 20 is open and has a spring retaining flange 20b integrally formed therewith. Flange 20b has an outer diameter that is slidably fitted to cylinder wall 18g of housing 18 and defines a downwardly facing, annular shoulder 20c which contacts the upper end of spring 22 thereby holding spring 22 in compression between shoulder 20c of member 20 and shoulder 18h of housing 18, as best shown in FIG. 3. This arrangement of spring 22 and the positive guiding of member 20 by cylinder wall 18f provide a fail safe configuration such that if the spring 22 breaks, the valve member will tend to drop down and close off port 18c to allow effective pressurization of the cabin. The surface of end wall 20a of member 20 that confronts port 18c is provided with a concave depression coaxial with member 20, which as described below, enhances a self-cleaning airflow effect as cabin air, at a relatively higher than outside pressure, escapes through the valve during the transition of the valve to and from a closed, airtight seal condition, shown in FIG. 4.

Cap 24, as mentioned, seats in recess 18i of housing 18 after spring 22 and valve member 20 have been installed in the housing. During assembly, spring 22 is partially compressed for creating a positive bias that holds member 20 away from port 18c. Any suitable means may be used for securing cap 24 in place such as by adhesive bonding. To enable air pressure within the fuselage to act on the piston-like valve member 20, cap 24 is formed with apertures 24a, here in the shape of a criss-cross, in which the dimensions of apertures 24a are selected to communicate the interior air pressure to the upwardly facing surfaces of flange 20b and end wall 20a of member 20, but not so large as to allow debris to fall into the valve housing.

When used on a commercial carrier, a relatively large number of such valve assemblies 10 are arranged on the belly of an aircraft fuselage as shown by FIG. 7 to ensure that condensation which accumulates at various collection points in the lowermost bilge-like area of the fuselage, is adequately drained. It will be appreciated from the schematic illustration of the number and location of valve assemblies 10 as shown in FIG. 7, that should even a few of the valves fail to completely close during cabin pressurization, a significant air loss will occur and hence, cause a substantial loss of engine and fuel efficiency. Also, air leaks can reduce the effectiveness of fire suppressing chemicals discharged into the cargo hold. The difficulty of accessing and servicing such a large number of valve assemblies in the interior of the aircraft will be appreciated, especially since the cargo compartment floors must be removed in most cases to reach the mounting sites of the valves. However, the preferred embodiment of valve assembly 10 overcomes, for the most part, this access problem by the above-described construction which allows valve subassembly 17 to be removed and inserted, as a unit through opening 14 and when installed, to be held in place by threaded engagement with a mated, internally threaded opening 16b in retainer 16.

To install valve assembly 10, retainer 16 is first arranged approximately in alignment with opening 14 on the inside surface of 12a of wall 12, and then valve subassembly 17 is inserted through opening 14 from the outside of fuselage wall 12 and screwed into engagement with retainer 16 prior to installing fastening rivets 28 as depicted in FIGS. 1 and 3. Then the rivets 28 are installed to complete the mounting of the valve assembly.

To facilitate the installation of valve subassembly 17, and more specifically to facilitate the subsequent removal of the subassembly for servicing, a torque applying tool 30, such as depicted in FIG. 6 is used. As mentioned above, valve port 18c of housing wall 18e is formed with a tool receiving, torque reacting shape, here in the form of a hexagonal configuration. Accordingly, tool 30, as shown in FIG. 6, has a mating hexagonal head that is insertable into port 18c to apply the necessary rotating force to install and remove subassembly 17.

The threaded engagement of the housing 18 of valve subassembly 17 and retainer 16 have the advantage of accommodating various skin thicknesses of fuselage wall 12. Wall 12 may typically range from a thickness of one-eighth inch to one-quarter inch. By forming housing 18 with a sufficient number of threads along its axis, a standard assembly may be used for any skin thickness within the above range, simply by screwing subassembly 17 further into retainer 16 to accommodate the thinner fuselage skins.

While there are a number of different materials available, from which the components of valve assembly 10 may be manufactured, in this preferred embodiment, retainer 16, valve housing 18, valve member 20 and cap 24 are made from a tough, durable, synthesized plastic sold under the tradename of Valox, by General Electric Corporation. The properties of this material provide the advantages of being tough, relatively lightweight and resistant to corrosion. Spring 22 is made from corrosion resistant stainless steel and is selected to provide a sufficient bias such that the valve member 20 will close and open at a differential pressure of approximately two pounds per square inch.

During operation of the aircraft, pressurization and heating of the aircraft cabin result in condensation being formed inside the fuselage which accumulates and collects at the various drain locations depicted in FIG. 7. Moreover, debris including dirt, grit, metal chips, miscellaneous fasteners dropped by workman, and other foreign object accumulate in the belly of the aircraft beneath the lowermost floorboards, such as the cargo compartment floorboards. This mixture of condensate and debris, forms a sludge kind of intermixed with larger objects, which can clog the drains and interfere with the proper operation of self-acting valves, as described previously in the background section. However, the provision of a retainer having the shape, as described above, and the selectively sized cutouts 16a, effectively blocks most of the sludge and all of the usually present fastener parts, from reaching valve subassembly 17. Furthermore, any fine debris which passes through cutouts 16a is automatically cleaned from the valve area by the accelerated airflow through the partially opened valve as it responds to a differentially higher pressure in the aircraft cabin during transition to and from a valve closed position. The airflow as indicated by arrow 26 in FIG. 26 cleans valve seat 18b on wall 18c of the housing and this self-cleaning action is enhanced by the concaved depression 20d on the end wall of valve member 20. In particular, depression 20d is believed to generate additional turbulence that would not otherwise be present in the escaping air and this turbulence in turn produces a scouring airflow action which blows away any obstructing debris that might otherwise settle on valve seat 18d around the perimeter of valve port 18c.

Additionally, the configuration and arrangement of valve assembly components, as described above, is believed to create a more effective and reliable closing of valve member 20 in response to the above-mentioned differential pressure. As the aircraft cabin is pressurized, the increasing pressure acts on valve member 20 as though a piston, forcing it downwardly against biased spring 22. Additionally, a suction force is created due to the initial rush of air trying to escape from the fuselage as the cabin is rapidly pressurized. This suction assists in pulling valve member 20 downwardly to seat 18b.

While only a particular embodiment has been disclosed herein, it will be readily apparent to persons skilled in the art, that numerous changes and modifications can be made thereto including the use of equivalent means and devices without departing from the spirit of the invention. For example, in the above-described embodiment, spring member 22 and valve member 20 are held in their assembled position inside housing 18 by bonding end cap 24 in recess 18i (FIGS. 3 and 5). An alternative construction of valve subassembly 17 is to form valve housing 18 with integral foldable tabs at the upper, open end. After installing spring 22 and valve member 20, such tabs would then be folded over to extend inwardly from the perimeter of housing 18 and heat crimped or otherwise permanently affixed in that configuration to retain the upward bias of valve member 20 responding to spring 22.

The embodiments of an invention in which an exclusive property or privilege is claimed are defined as follows:

1. An aircraft valve adapted to be mounted on a lower wall of a fuselage in registration with an opening in such wall for assuming a normally valve open condition for draining condensate collected inside the fuselage through such wall opening, and for responding to differentially higher interior cabin-air pressure relative to ambient air pressure outside the fuselage to assume a valve closed condition for sealing the interior of the aircraft for cabin pressurization, wherein said valve comprises:
   a valve housing retainer affixed to an inner surface of said fuselage wall and in registration with the wall opening;
   a valve housing, said valve housing retainer receiving said valve housing and having with said valve housing cooperating fastening means for detachably fastening said valve housing to said retainer, said valve housing and said cooperating fastening means being configured so that said valve housing is installable and removable and said fastening means operable from the exterior of said fuselage through said wall opening;
   a valve member mounted in said valve housing for reciprocative movement from a valve open position to an air-tight valve closed position in response to said differentially higher interior cabin air pressure; and
   biasing means also mounted in said housing for biasing said valve member to said open position, said biasing means yielding to said differential interior cabin air pressure to cause said valve member to move to said valve closed position.

2. The aircraft valve of claim 1, wherein said retainer is shaped and mounted so as to surround a perimeter of said wall opening on the inner surface of the fuselage wall and has ports formed therein for passing fluid from the interior of the fuselage to said valve housing fastened to said retainer;

said valve housing having an insertable body portion sized to fit through said wall opening from the exterior of the fuselage and having a flange portion protruding from said insertable body portion and sized to seat against a periphery of said wall opening on the outer surface of said fuselage wall; and said fastening means being provided by complimentary coupling means on said retainer and said insertable body portion of said valve housing, said coupling means being engageable and disengageable from the exterior of said fuselage wall.

3. The valve of claim 2, wherein said opening in the fuselage wall is circular and said complimentary coupling means comprise matching threads formed on said retainer and said insertable body portion of said valve housing, said threads being coaxial with said fuselage wall opening.

4. The valve of claim 3, wherein said valve housing is generally cylindrical and has a hollow interior open at both ends, said insertable body portion of said valve housing being provided at one of said ends and said flange portion being provided at the opposite of said ends, said retainer having a body formed with an opening overlying and in registration with said wall opening of said fuselage, and wherein said complimentary coupling means comprise interior threads formed on said opening of said retainer body and matching threads formed on an exterior surface of said insertable body portion of said valve housing.

5. The aircraft valve of claim 4, wherein said open end of said valve housing adjacent said flange portion is formed with tool receiving means adapted for receiving a tool rotating force whereby said valve housing may be screwed into and screwed out of engagement with said valve housing retainer.

6. The aircraft valve of claim 5, wherein said tool receiving means at said open end of said valve housing has a polygonal shape adapted for receiving a complementary shaped tool.

7. The aircraft valve of claim 1, wherein said valve member has a generally cylindrical shape including an end wall that moves toward and away from a valve port in said valve housing to respectively close and open the valve, said end wall of said valve member having an air turbulance causing depression form therein for self-cleaning of surfaces surrounding said valve port.

8. The aircraft valve of claim 2, wherein said retainer is generally of an inverted cup shape having a lowermost edge that contacts said inner surface of said fuselage wall, and a plurality fluid passing, debris blocking cutoffs being formed in said retainer adjacent said lowermost edge.

9. The aircraft valve of claim 8, wherein said retainer has an interiorly threaded opening in an upper wall portion that overlies said wall opening in said fuselage, and said valve housing has a threaded exterior wall that is threadedly engaged with said retainer opening.

10. The aircraft valve of claim 1 wherein said valve housing is generally cylindrical and hollow and said fuselage wall opening is circular, said valve housing having a passageway from in the side thereof proximate said inner surface of said fuselage wall for communicating fluid and air from the inside of said fuselage wall to an interior of said valve housing, and valve port means provided in said valve housing and cooperating with said valve member for being in communication with said passageway of said valve housing when in the valve open position and being blocked from said passageway when in the valve closed position.

* * * * *